UNITED STATES PATENT OFFICE.

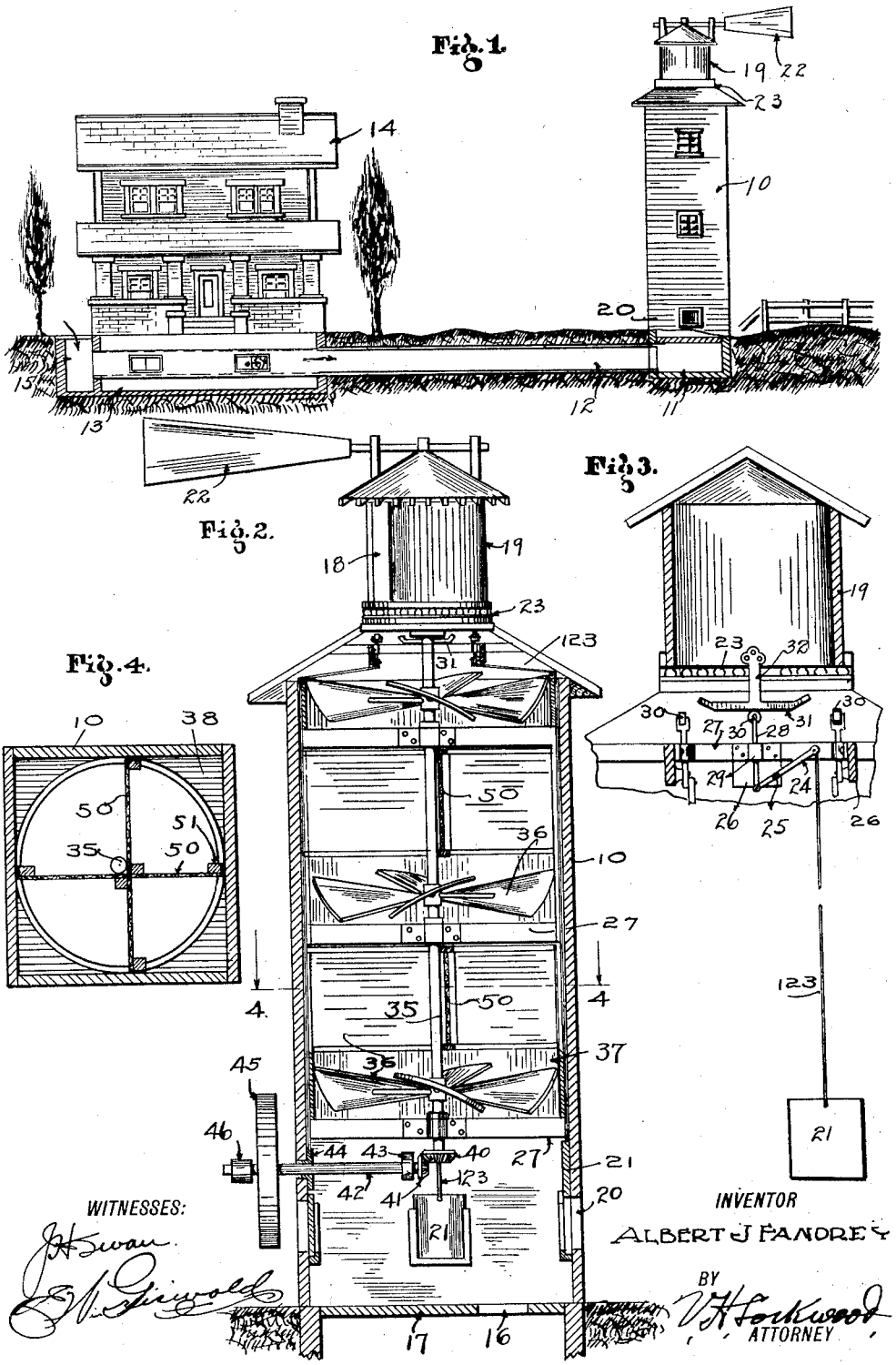

ALBERT J. FANDREY, OF INDIANAPOLIS, INDIANA.

ATMOSPHERIC POWER-GENERATOR.

1,112,203.  Specification of Letters Patent.  Patented Sept. 29, 1914.

Application filed April 1, 1913. Serial No. 758,118.

*To all whom it may concern:*

Be it known that I, ALBERT J. FANDREY, a citizen of the United States, and a resident of Indianapolis, county of Marion, and State of Indiana, have invented a certain new and useful Atmospheric Power-Generator; and I do hereby declare that the following is a full, clear, and exact description thereof, reference being had to the accompanying drawings, in which like letters refer to like parts.

The object of this invention is to provide an improved construction of an atmospheric power generator. In this kind of generator, a tower is provided through which a current of air passes or rises and a shaft is provided with transversely disposed wind wheels in said tower to be acted upon and actuated by said current for generating power.

One feature of the invention consists in providing such tower with air inlets near the lower end on the various sides and adapted to be closed by a weather vane and furnishing also the outlet so that the weather vane will turn the top so that the outlet will be on the lee side, the connection between the revolving top and the doors being arranged so that the side of the tower opposite the weather vane will be open and the other doors closed. In this manner the wind is enabled to blow in the opening in the lower part of the tower and pass up through the tower and out without the wind at the top interfering with its issue. And the weather vane not only controls the use of the wind, but also the entrance of the wind into the tower, and as the wind turns the weather vane and revolving top, it opens and closes the doors in the lower part of the tower accordingly.

Another feature of the invention consists in providing within the tower at intervals short cylinders through which the current of air must pass and mounting horizontally disposed wind wheels therein. Preferably this structure is immediately above and supported by a horizontal frame located in the tower like floors or stories in houses.

Another feature of the invention consists in providing a plurality of wind wheels between each pair of wind wheels locating vertical wind guides so as to cause the current passing from one wind wheel to another to go vertical or straight and thus exert a greater influence on the wind wheel above.

Still another feature of the invention consists in providing an air inlet opening in the bottom of the tower which is in communication by means of a tunnel with the cellar of a house or other similar chamber where there is warm air so that an air current will be formed leading up through the tower.

The full nature of the invention will be understood from the accompanying drawings and the following description and claims:

In the drawings, Figure 1 is a front elevation of a residence and a power generating tower with the ground in vertical section so as to show the cellar under the residence and the tunnel leading to the tower. Fig. 2 is a central vertical section through the tower excepting the revolving top which is shown in side elevation. Fig. 3 is a vertical section through the upper part of the tower. Fig. 4 is a horizontal section on the line 4—4 of Fig. 2.

There is shown in Fig. 1 a tower 10 having a basement chamber 11 under ground communicating by a tunnel 12 with the cellar 13 of a residence 14. There is an air inlet chamber 15 to the cellar. The heated air in the basement of the house escapes through the tunnel 12 to the chamber 11 at the bottom of the tower 10 and thence it passes through the opening 16 in the floor 17 of the tower into the lower part of the tower and thence upward through the tower and out at the discharge opening 18 of the revolving top 19. Furthermore on each of the four sides of the tower there are air inlet openings 20 adapted to be closed by vertical sliding doors 21, and when any of these openings is uncovered, the air enters or blows through the opening into the lower part of the tower and passes upward through the tower. The intention is that the opening 20 is to be on the side from which the wind blows so that the wind will blow into the lower part of the tower. In order that the outlet for the air from the upper part of the tower be facilitated rather than hindered by the wind, the outlet opening 18 is always turned away from the wind and it is accomplished by a weather vane 22 secured to the top of the tower in position to turn the top. The top 19 rides on ball bearings 23 so that the wind will be able to readily turn the top. Means are provided also so that the revolving top 19 will open the openings 20 in the bottom of the tower, one at a time, and will uncover the opening which is on the wind side of the tower for the time being. This mechanism consists of a cable 23 connected with a door 21 and running just inside the wall of the tower to a lever 24 fulcrumed at 25 on a plate 26 secured to an upper cross frame 27. The lever 24 is pivoted to the lower end of a plunger 28 which is vertically mounted in and actuated by a bearing 29 on the plate 26 and carries a roller 30 on the upper end. This roller is engaged by a horizontal track bar 31 which is secured to an arm 32 fastened to the inner wall of the revolving top 19 at a point diametrically opposite the middle of the outlet opening 18. The ends of the track bar 31 are turned up and beveled so that they will press the plunger 28 down and thereby elevate the sliding door which is on the side of the tower opposite the weather vane, for the time being. Since there are four sides to the tower there are four doors 21 and four levers 24 and plungers 28. Therefore, as the top 19 is revolved by the wind, the track bar 31 will engage first one and then another of the rollers 30 on top of the plungers 28 and open the door opposite the weather vane. When the track bar 31 rides off of any plunger, the gravity of the door which has been elevated, will cause the closing of the door. Therefore, it is observed that this door controlled mechanism is automatic and needs no attention. There is a number of cross frames 27 in the tower and a wind wheel shaft 35 extends vertically and centrally through all of them and immediately above the cross frames wind wheels 36 are mounted on said shaft. The wind wheels are horizontal and immediately over the cross bars 27 there are cylinders arranged so as to snugly surround the wind wheels 36. Floors 38 are placed on each cross bar 27 excepting within said cylinder 37. Therefore, the current of air passing up through the tower must pass through said cylinders 37 in which the wind wheels operate. In this way the air current drives the wind wheels and shaft 35. Power is transmitted from the shaft 35 by beveled gears 40 and 41 to a driving shaft 42 which is horizontal with one end mounted in a bearing bracket 43 suspended from the lower cross frame 27 and also in a bearing 44 in the wall of the tower. The shaft 44 extends out beyond the tower and has a fly wheel 45 thereon and also a pulley 46 or other means whereby power is transmitted from the driving shaft 42 to any mechanism where power is needed. Between each pair of wind wheels 36 there are vertical current guides 50, extending from the cylinder 37 to the floor frame 27 above. These guides are merely canvas sheets secured to uprights 51 and there are preferably two of them at right angles to each other. The purpose of these guides is to make the current of air move in a truly vertical direction after it leaves one wind wheel and approaches the other above. Without these vertical guides 50, the wind would leave a lower wind wheel in an oblique direction and, therefore, strike the underside of the wind wheel above at a more obtuse angle and, therefore, less effective angle than if the current moved vertically.

The apparatus shown herein is for the purpose of merely illustrating the general nature of the invention, and, therefore, the invention is not limited to any of the details of this construction as any of the details may be modified without departing from the spirit of the invention.

I claim as my invention:

1. An atmospheric power generator including a tower with openings at the lower end thereof for the inlet of air, a revolving top, means within the tower adapted to be revolved by the current of air from the outlet on one side thereof, a weather vane secured to said top for turning the air outlet away from the wind, and means actuated by said revolving top for opening the air inlets at the lower part of the tower, as described.

2. An atmospheric power generator including a tower with openings at the lower end thereof for the inlet of air, a revolving top, means within the tower adapted to be revolved by the current of air from the outlet on one side thereof, a weather vane secured to said top for turning the air outlet away from the wind, and means actuated by the revolving top for opening the air inlet in the lower part of the tower which is located on the side opposite a particular position of the weather vane.

3. An atmospheric power generator including a tower with openings at the lower end thereof for the inlet of air, a revolving top, means within the tower adapted to be revolved by the current of air from the outlet on one side thereof, a weather vane secured to said top for turning the air outlet away from the wind, a door for closing each of said air inlet openings at the lower part of the tower, means located near the revolving top for opening each door, and means connected with the revolving top for engaging and actuating one of said door opening means at a time.

4. An atmospheric power generator including a tower with openings at the lower end thereof for the inlet of air, a revolving top, means within the tower adapted to be revolved by the current of air from the outlet on one side thereof, a weather vane secured to said top for turning the air outlet away from the wind, a vertically slidable door for each of said air inlet openings, a plunger located near said revolving top, means for connecting each plunger with the door of the same side as the plunger, and a track bar secured to the revolving top opposite the weather vane and in position to engage said plungers one at a time.

5. An atmospheric power generator including a tower with openings at the lower end thereof for the inlet of air, a revolving top, means within the tower adapted to be revolved by the current of air from the outlet on one side thereof, a weather vane secured to said top for turning the air outlet away from the wind, a vertically slidable door for each of said air inlet openings, a plunger located near said revolving top, a lever fulcrumed between its ends, a cable extending from the end of said lever to one of said doors, a roller extending from each plunger, and a track bar secured to the revolving top at a point opposite the weather vane and in position to engage the rollers on said plungers, one at a time.

In witness whereof, I have hereunto affixed my signature in the presence of the witnesses herein named.

ALBERT J. FANDREY.

Witnesses:
J. H. WELLS,
O. M. McLAUGHLIN.

Copies of this patent may be obtained for five cents each, by addressing the "Commissioner of Patents, Washington, D. C."